United States Patent
Kawamura

[11] Patent Number: 5,682,740
[45] Date of Patent: Nov. 4, 1997

[54] DIESEL PARTICULATE FILTER APPARATUS

[75] Inventor: Hideo Kawamura, Samukawa, Japan

[73] Assignee: Isuzu Ceramics Research Institute Co., Ltd., Kanagawa-ken, Japan

[21] Appl. No.: 642,434

[22] Filed: May 3, 1996

[30] Foreign Application Priority Data

May 12, 1995 [JP] Japan ................. 7-137484
May 12, 1995 [JP] Japan ................. 7-137486

[51] Int. Cl.⁶ ................................................. F01N 3/10
[52] U.S. Cl. ............................. 60/297; 60/303; 60/311; 55/523; 55/524; 55/521
[58] Field of Search .................. 60/297, 303, 311; 55/523, 524, 521, DIG. 30; 422/177, 180; 502/325, 332, 336, 338

[56] References Cited

U.S. PATENT DOCUMENTS

| | | | |
|---|---|---|---|
| 4,264,344 | 4/1981 | Ludecke et al. | 55/313 |
| 5,100,632 | 3/1992 | Dettling et al. | 423/213.5 |
| 5,179,061 | 1/1993 | Haerle | 502/339 |
| 5,458,664 | 10/1995 | Ishii et al. | 55/282 |
| 5,560,757 | 10/1996 | Suzuki et al. | 55/516 |

FOREIGN PATENT DOCUMENTS 6-108820  4/1994  Japan .

*Primary Examiner*—Stephen F. Husar
*Assistant Examiner*—Nhat-Hang H. Lam
*Attorney, Agent, or Firm*—Browdy and Neimark

[57] ABSTRACT

In a diesel particulate filter apparatus, the surface of the fiber of a ceramic fiber material 5 such as a silicon carbide fiber material is covered with a coating layer made up of a $Ba_2In_2O_5$, $Ba_3Y_4O_9$ or $BaLa_2O_4$ compound having a brownmillerite-like structure having an $NO_x$-reducing action, and a glass layer. A filter body is constituted of a nonwoven fabric which is the randomly laminated ceramic fiber material with the coating layer on the surface of the fiber thereof. Alternatively, the diesel particulate filter apparatus may be constituted of a filter body made of a nonwoven fabric which is a randomly laminated ceramic fiber material, and a porous sinter containing the above-mentioned compound, provided that the porous sinter is disposed on the downstream side of the filter body.

20 Claims, 6 Drawing Sheets

DIESEL PARTICULATE FILTER APPARATUS

BACKGROUND OF THE INVENTION

1. Field of the Invention

The present invention relates to a diesel particulate filter apparatus for collecting particulates contained in the exhaust gas discharged from a diesel engine.

2. Description of the Prior Art

Since combustion in a diesel engine is effected under the condition of an excessive proportion of air, $O_2$ is present in the exhaust gas and a large amount of $NO_x$ is therefore discharged from the diesel engine. By contrast, since combustion in a gasoline engine is effected at a theoretical mixing ratio of air to gasoline, little $O_2$ is present in the exhaust gas to present any problem with $NO_x$. There have heretofore been known diesel particulate filters having a variety of respective catalysts incorporated thereinto in order to suppress the discharge of $NO_x$ from diesel engines to the atmosphere. For example, there has been known a diesel particulate filter having a zeolite catalyst (Cu-ZSM-5) incorporated thereinto. On the other hand, in a filter structure wherein a catalyst unit is incorporated into a diesel particulate filter, a method of passing exhaust gas through the openings of the filter is adopted like in a general-purpose gasoline engine.

The exhaust gas discharged from a diesel engine contains particulates (particulate substances) in the form of aggregates of fine particles such as carbon, soot and HC. Known examples of the material of a filter for collecting particulates from exhaust gas include cordierite and inorganic fibers.

A filter body made using inorganic fibers is formed by twisting an inorganic fiber material into a twist yarn, laminating the resulting twist yarns into a cop form, weaving the inorganic fiber material diagonally into the resulting laminate to effect felting. The filter body made of the inorganic fiber material can be miniaturized as compared with a honeycomb filter made of cordierite because the former enables particulates such as carbon and smoke in the exhaust gas discharged from a diesel engine to be trapped in the inner part of the filter body as well as on the surface thereof.

Further, Japanese Patent Laid-Open No. 108,820/1994 discloses a heat-resistant filter wherein a filtering layer formed of randomly integrated heat-resistant fibers is provided between air-permeable partitions, of which at least a partition disposed on the downstream side in the direction of passage of a fluid to be filtered is formed of a facing entwined fabric made of heat-resistant fibers.

Meanwhile, a diesel particulate filter apparatus having a filter having zeolite incorporated thereinto has heretofore been known. Zeolite, which is generally used as a catalyst, has a tunnel-like molecule. Since $NO_x$ particles are smaller than $O_2$ particles, $NO_x$ that has entered the tunnel-like molecule can be adsorbed on zeolite, and subjected there to a reduction reaction. However, the reduction reaction of $NO_x$ cannot sufficiently be effected due to interruption thereof by the particulates in the exhaust gas, with the result that the degree of $NO_x$ purging from the exhaust gas is 20 to 40%.

In the diesel particulate filter having a zeolite catalyst incorporated thereinto, the zeolite catalyst has a feature that it makes use of hydrocarbons as a reducing agent to reduce and decompose $NO_x$. In an $NO_x$ filter wherein a zeolite catalyst is used, however, methanol or ethanol is necessary as a reducing agent for hydrocarbons. Thus, the use of such a catalyst in a diesel engine makes the structure thereof so complicated that the diesel engine cannot be put into practical use. On the other hand, the diesel particulate filter apparatus having the catalyst unit incorporated thereinto involves a fear that, when graphite or particulates are deposited on the wall surfaces of the unit around the openings thereof and then come in contact with $NO_x$, HC hardly works as a reducing agent.

Meanwhile, brownmillerite-related compounds, namely those having the same kind of structure as brownmillerite (hereinafter sometimes referred to as "brownmillerite compounds" or "barium compounds"), are known as compounds capable of exhibiting order-disorder transition of oxygen defects. These compounds have the property that they undergo transition at a given temperature at which the crystal phase thereof undergoes phase transition from a rhombic crystal phase to a perovskite cubic crystal phase. These compounds are remarkably improved in ionic conduction due to oxygen defects disordered as a result of the above-mentioned phase transition. This ionic conduction is capable of decomposing $NO_x$. Specifically, the following reaction occurs. $Vo^x + NO \rightarrow (\frac{1}{2}) \cdot N_2 + (\frac{1}{2}) \cdot O_2 + Vo^y$, wherein $Vo^x$ is an ionized oxygen defect, and $Vo^y$ is an order factor.

SUMMARY OF THE INVENTION

An object of the present invention is to solve the foregoing problems of the prior art, i.e., to provide a diesel particulate filter apparatus for collecting particulates contained in the exhaust gas of a diesel engine with filtering fiber materials, wherein silicon carbide fiber materials, the surface of the fiber of which is coated with a compound having a brownmillerite-like structure, are used as the filtering fiber materials, and wherein $NO_x$ in the exhaust gas is reduced due to the presence of the brownmillerite compound to decrease the amount of $NO_x$.

The present invention is directed to a diesel particulate filter apparatus with fiber materials constituted of ceramic fiber materials, wherein the surface of the fiber of the ceramic fiber materials is covered with a coating layer made of a compound having a brownmillerite-like structure as mentioned above that has an $NO_x$-reducing action, and wherein the filter bodies are constituted of nonwoven fabrics which are randomly laminated ceramic fiber materials with the coating layer on the surface of the fiber thereof.

The brownmillerite-like compound constituting the coating layer may be $Ba_2In_2O_5$, $Ba_3Y_4O_9$, or $BaLa_2O_4$ capable of exhibiting order-disorder transition of oxygen defects.

The coating layer on the surface of the fiber of the ceramic fiber materials may be formed by attaching a liquid layer of an oxynitride glass to the surface of the fiber, further attaching to the surface thereof a powder of $Ba_2In_2O_5$, $Ba_3Y_4O_9$, or $BaLa_2O_4$, and then sintering the resulting composite coating layer.

The ceramic fiber materials may be constituted of an SiC fiber material, an SiC—Ti—O fiber material, or an $Si_3N_4$ fiber material.

Conductive metal nets are disposed on the surfaces of the filter bodies constituted of the nonwoven fabrics. Particulates collected with the filter bodies are heated and incinerated by supplying electric current to the metal nets.

The outer peripheries of the filter bodies constituted of the nonwoven fabrics may be covered with heat-barrier layers to effect heat insulation thereof.

Ceramic fiber materials constituted of an SiC fiber material and/or an $Si_3N_4$ fiber material may be disposed on the upstream side of the exhaust gas, while the nonwoven fabrics, which are the ceramic fiber materials with the coating layer on the surface of the fiber thereof, may be disposed on the downstream side thereof.

In the diesel particulate filter apparatus of the present invention having the foregoing constitution, since the filter bodies are constituted of the randomly laminated fiber materials such as silicon carbide and/or silicon nitride ceramic fiber materials, the surface of the fiber of which is covered with the coating layer made of the above-mentioned compound capable of exhibiting order-disorder transition of oxygen defects, particulates in the exhaust gas are collected with the filter bodies to deposit between fibers when high-temperature exhaust gas heated up to a given temperature is passed across the filter bodies wherein exhaust gas flows zigzag through the openings of the laminate portions of the filter bodies. Since fibers constituting the ceramic fiber materials are mutually laminated, $NO_x$ reacts with ions based on the oxygen defects of the coating layers to be reduced, when the exhaust gas containing $NO_x$ collides against the coating layers covering the mutually laminated fibers constituting the ceramic fiber materials. Even when particulates collide against the filter bodies, they are not in close contact with the ceramic fiber materials due to the presence of the coating layers. Thus, the reduction reaction of $NO_x$ quickly occurs if exhaust gas containing $NO_x$ has a collision speed.

In this diesel particulate filter apparatus, therefore, the amount of $NO_x$ in the exhaust gas is decreased by the ceramic fiber materials because of the reduction reaction of $NO_x$ contained in the exhaust gas by the action of the coating layers, while particulates contained in the exhaust gas are collected with the ceramic fiber materials to be decreased in the amount thereof in the exhaust gas.

Moreover, the compound having the brownmillerite-like structure ($Ba_2In_2O_5$, $Ba_3Y_4O_9$, or $BaLa_2O_4$) that constitutes the coating layers has the capability of ionization by heat energy. Accordingly, although the generation of $NO_x$ is increased at a high temperature, such brownmillerite-like compound is activated at the high temperature to make the reduction reaction of $NO_x$ active. On the other hand, so little $NO_x$ is generated at a low temperature that it is unnecessary to activate such brownmillerite-like compound. Although a large amount of carbon is generated at a low temperature, it can be collected with the filter itself. Meanwhile, $O_2$ is necessary for the activation of the brownmillerite-like compound. Since a large amount of $O_2$ is contained in the exhaust gas in the case of a diesel engine, however, the reduction of $NO_x$ is satisfactorily effected. In short, the brownmillerite-like compound is a compound having a heat-resisting temperature of about 900° C. and exhibiting order-disorder transition to form cations at a temperature of 400°–500° C. or above, and hence comes to have a good ionic conduction to thereby acquire the function of decomposing $NO_x$ when the temperature is elevated.

The coating layer can be formed on the surface of the fiber of the ceramic fiber materials by coating an SiC fiber with glass, then attaching thereto a powder of the brownmillerite-like compound, and sintering the resulting composite coating layer. When a large load is applied onto the diesel engine to raise the temperature of combustion gas, the ionization of brownmillerite-like compound becomes active to make the reduction reaction of $NO_x$ active since the activation temperature of the brownmillerite-like compound is 400° to 500° C. On the other hand, when the temperature is lowered, the generation of $NO_x$ in the diesel engine is decreased to present no problem despite a decrease in the ionization of the brownmillerite-like compound. The particulates attached to and collected with the SiC fibers constituting the filter have a large number of openings where $NO_x$ enters and comes in contact with the said compound having a brownmillerite-like structure to bring about the activation thereof, whereby $NO_x$ contained in the particulates can be reduced to decrease the discharge of $NO_x$.

Since this diesel particulate filter apparatus has the foregoing constitution, the above-mentioned compound decomposes $NO_x$ contained in the exhaust gas through the reduction reaction thereof to convert it into $N_2$ and $O_2$ to thereby decrease the amount of $NO_x$ in the exhaust gas. Further, since the surface of the fiber of the ceramic fiber materials is covered with the coating layer, the exhaust gas is not brought into direct contact with the ceramic fiber materials, whereby the durability of the ceramic fiber materials can be improved.

Furthermore, even if collection of particulates with the filter bodies and subsequent heating and incineration of the particulates for regeneration of the filter bodies are repeated, the filter bodies and the metal nets are neither separated from each other nor deformed, and the filter bodies are not abnormally overheated locally during the heating and incineration of the particulates, while no noise is produced by the filter bodies themselves. Further, since the filter bodies are clamped by the metal nets, the filter bodies themselves can be very easily shaped to improve the shaping workability thereof. Moreover, since the outer peripheries of the filter bodies are covered with the metal nets, the ceramic fibers of the ceramic fiber materials can be prevented from being separated from one another and scattered.

In the case of the filter bodies wherein the ceramic fiber materials constituted of an SiC fiber material and/or an $Si_3N_4$ fiber material are disposed on the upstream side of the exhaust gas and the nonwoven fabrics with the coating layer on the surface of the fiber of the ceramic fiber materials are disposed on the downstream side thereof, particulates are collected with the ceramic fiber materials disposed on the upstream side of exhaust gas, and $NO_x$ is then reduced by the action of the filter bodies with the coating layer on the surface of the fiber of the ceramic fiber materials disposed on the downstream side of the exhaust gas, whereby the exhaust gas can be purified as a whole.

Another object of the present invention is to solve the aforementioned problems of the prior art, i.e., to provide a diesel particulate filter apparatus wherein particulates contained in the exhaust gas of a diesel engine are collected with ceramic fiber materials, while $NO_x$ contained in the exhaust gas is reduced by the action of porous sinters containing such a compound having a brownmillerite-like structure and disposed adjacent to the ceramic fiber materials, whereby the amounts of the particulates and $NO_x$ in the exhaust gas can be decreased.

The present invention is also directed to a diesel particulate filter apparatus comprising randomly laminated ceramic fiber materials such as nonwoven fabrics for collecting the particulates contained in the exhaust gas of a diesel engine, conductive metal nets each disposed on one side of each ceramic fiber material, and tubular porous sinters containing such brownmillerite-like structure compound having an $NO_x$-reducing action and disposed on the other side thereof.

The porous sinters may be formed by mixing the compound having a brownmillerite-like structure and capable of exhibiting order-disorder transition of oxygen defects ($Ba_2In_2O_5$, $Ba_3Y_4O_9$, or $BaLa_2O_4$) with an oxynitride glass, and sintering the resulting mixture. The oxynitride glass may be an Mg—Al—Si—O—N or Y—Al—Si—O—N mixture comprising $SiO_2$, $Al_2O_3$ and MgO or the like as well as N added thereto. Further, the porous sinters may be controlled to have a pore size of 15 to 50 µm.

Accordingly, the porous sinters, which are each made up of such a brownmillerite-like compound ceramic and a glass layer, can be improved in strength and durability. The porous sinters can be so formed as to have simple structures because it will suffice when they have increase surface areas by sintering.

The porous sinters may be tubes having pleated portions jagged on the outer surfaces thereof. The ceramic fiber materials may be filled between the pleated portions of the porous sinters as well as along the outer peripheries of the porous sinters, and the conductive metal nets are disposed on the outer sides of the porous sinters.

The ceramic fiber materials may be constituted of long fibers of an SiC fiber material and/or an $Si_3N_4$ fiber materials.

Electric current is supplied to the metal nets to heat and incinerate the particulates collected with the ceramic fiber materials, and when the exhaust gas is passed across the porous sinters, $NO_x$ is reduced.

Since this particulate filter apparatus has the foregoing constitution, the particulates in the form of aggregates of fine particles contained in the exhaust gas are collected with the ceramic fiber materials to deposit between fibers when high-temperature exhaust gas flows zigzag through the openings of the laminate portions constituted of the ceramic fiber materials. When the exhaust gas then collides against the porous sinters, $NO_x$ reacts with the ions based on oxygen defects of the porous sinters to be reduced. The reduction reaction of $NO_x$ quickly occurs due to the catalytic action of the porous sinters if the exhaust gas containing $NO_x$ has a collision speed.

This diesel particulate filter apparatus can be easily produced to have a simple structure since the porous sinters having a bellows-like or pleated structure are formed from the compound having a brownmillerite-like structure, the ceramic fiber materials for collecting particulates are disposed in the recesses of the porous sinters on the upstream sides thereof and along the outer peripheries of the porous sinters, and the metal nets are wound around the outer peripheries of the ceramic fiber materials. Thus, the particulates in the exhaust gas are first collected with the ceramic fiber materials and then $NO_x$ in the exhaust gas is reduced by the action of the brownmillerite-like compound, thus purifying the exhaust gas in two stages. After the particulates are heated and incinerated or when the load on an engine is lowered, the temperature of the exhaust gas is so lowered as to prevent ionization of the brownmillerite-like compound, which is activated again in the subsequent stage.

When particulates are collected in an amount exceeding a predetermined value with the ceramic fiber materials, electric current is supplied to the metal nets disposed on the outer sides of the ceramic fiber materials to heat and incinerate the particulates collected with the ceramic fiber materials, thereby regenerating the ceramic fiber materials. The amount of $NO_x$ in the exhaust gas is decreased through the reduction reaction of $NO_x$ contained in the exhaust gas by the action of the porous sinters, while particulates contained in the exhaust gas are collected with the ceramic fiber materials to be decreased in amount. Moreover, since the aforementioned compound constituting the porous sinters has the capability of reversible ionization, the reduction of $NO_x$ can be satisfactorily effected in the case of a diesel engine discharging exhaust gas containing a large amount of $O_2$.

In this diesel particulate filter apparatus, $NO_x$ contained in the exhaust gas is decomposed into $N_2$ and $O_2$ through the reduction reaction thereof by the action of the aforementioned compound as described above to decrease the amount of $NO_x$ in the exhaust gas. Since the ceramic fiber materials are disposed on the upstream sides of the porous sinters, particulates contained in the exhaust gas are collected with the ceramic fiber materials when the exhaust gas is passed across the ceramic fiber materials. When the particulates are collected in an amount exceeding a predetermined value with the ceramic fiber materials, electric current is supplied to the metal nets wound around the outer peripheries of the ceramic fiber materials, whereby the particulates can be heated and incinerated.

Even if collection of particulates with the filter bodies and subsequent heating and incineration of the particulates for regeneration of the filter bodies are repeated, the ceramic fibers of the ceramic fiber materials can be prevented from being separated from one another and scattered, the ceramic fiber materials and the metal nets are neither separated from each other nor deformed, the ceramic fiber materials are not abnormally overheated locally, and no noise is produced by the filter bodies themselves, because the outer peripheries of the ceramic fiber materials are covered with the metal nets.

DETAILED DESCRIPTION OF THE EMBODIMENTS

An embodiment of the diesel particulate filter apparatus of the present invention will now be described with reference to the drawings.

Figure 1:
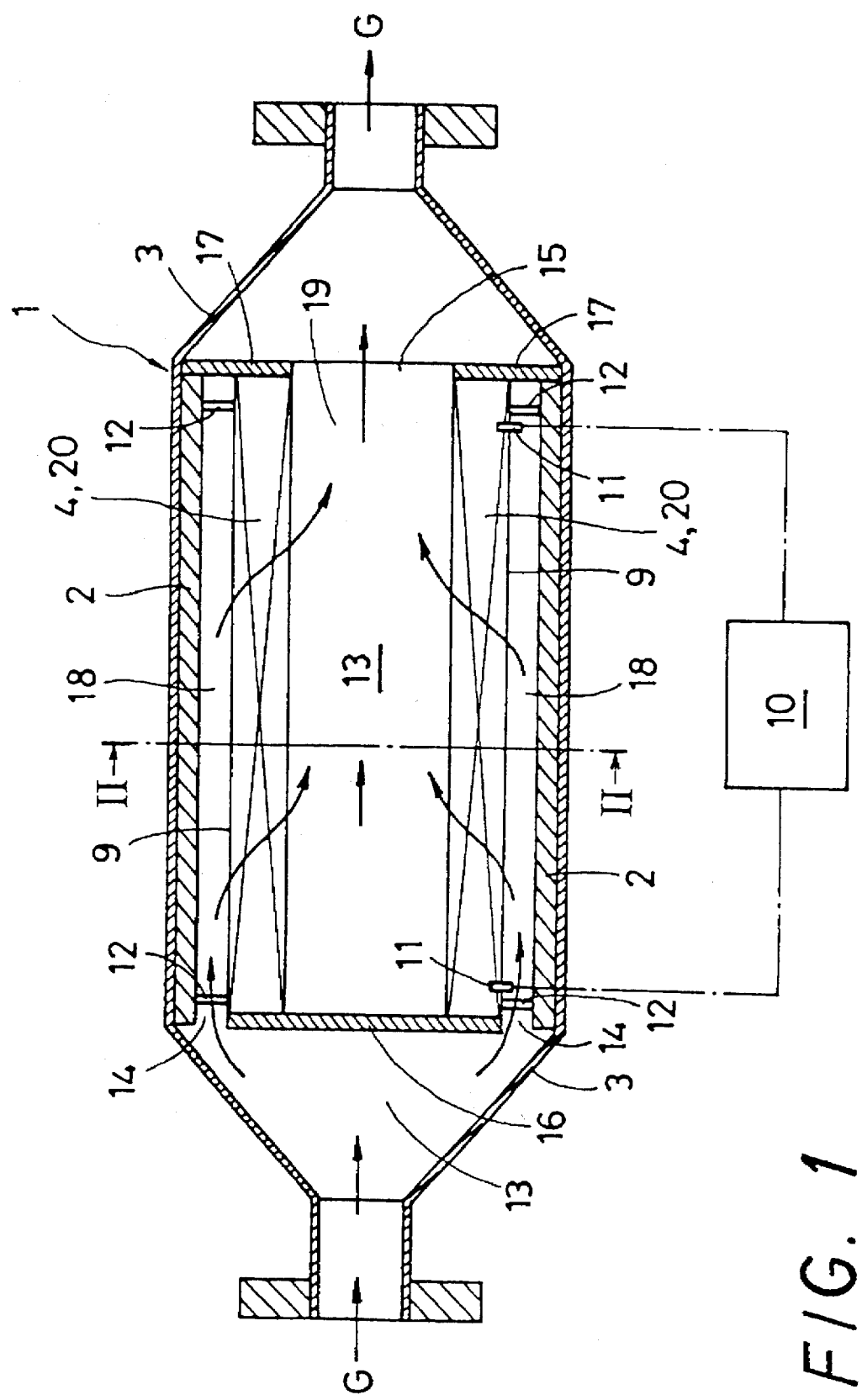
FIG. 1 is a schematic cross-sectional view of an embodiment of the diesel particulate filter apparatus of the present invention.
Figure 2:
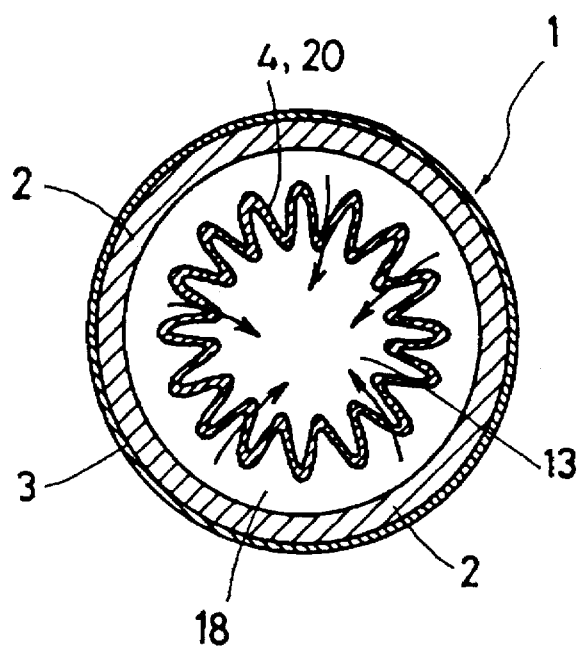
FIG. 2 is a cross-sectional view taken along the line II—II of the diesel particulate filter apparatus of FIG. 1.

The diesel particulate filter apparatus 1 of this example is constructed to be housed, for example, in a case 3 incorporated into an exhaust pipe of a diesel engine. When the exhaust gas discharged from the diesel engine is flowed across a filter body 4 or 20 in the directions indicated by the arrows G, particulates such as black smoke, carbon, soot and HC contained in the exhaust gas are collected with the filter body 4 or 20. The collected particulates are heated and incinerated to regenerate the filter body 4 or 20. The filter body 4 or 20 is made of a ceramic fiber as will be described later to be bent in a pleated tubular form as shown in FIG. 2. The regeneration of the filter body 4 or 20 can be attained by supply electric current to conductive metal nets 9 to heat and incinerate the particulates collected with the filter body 4 or 20 in the same manner as in the case of conventional filter bodies. Although the filter body 4 or 20 is sequentially bent in the corrugated form in FIG. 2, it may be in the form of a tube such as a cylinder, a flat plate, a wavy profile, a pleated profile, or the like.

The filter body 4 or 20 is disposed extending from an inlet 14 to an outlet 15 in an exhaust gas path 13 in the case 3 constructed into a heat-barrier structure with a heat-barrier layer 2 on the inside thereof. The heat-barrier layer 2 disposed between the case 3 and the filter body 4 or 20 is provided in order to prevent the heat from being radiated outward via the case 3. The filter body 4 or 20 is fixed to the case 3 by means of fasteners 12. The metal nets 9 are incorporated in the filter body 4 or 20. When the exhaust gas discharged from the diesel engine is flowed across the filter body 4 or 20, the particulates contained in the exhaust gas are collected with the filter body 4 or 20. When electric current is supplied to the metal nets 9 via terminals 11 according to the command of a controller 10, the particulates collected with the filter body 4 or 20 are heated and incinerated to be converted into gases such as $CO_2$ and $H_2O$, which are discharged from the outlet 15.

A pleated body is shaped into a tubular form to form the filter body 4 or 20. On the side of the inlet 14, a hollow portion 18 is open, while the other region is closed with a shield plate 16. On the side of the outlet 15, the hollow portion 18 is closed with a shield plate 17, while a central portion 19 of the other region is open. Accordingly, the exhaust gas inflowing from the inlet 14 of the exhaust gas path 13 is flowed from the hollow portion 18 across the filter body 4 or 20 to the inside of the central portion 19 to collect particulates in the exhaust gas with the filter body 4 or 20, from which the exhaust gas is then discharged toward the outlet 15. As for the regeneration of the filter body 4 or 20, for example, the pressure of exhaust gas is detected with a pressure sensor to detect the amount of the particulates collected with the filter body 4 or 20. When the amount of the collected particulates exceeds a predetermined value, the particulates collected with the filter body 4 or 20 are heated and incinerated while controlling the electric current supplied to the metal nets 9 according to the command of the controller 10 to regenerate the filter body 4 or 20. The conductive metal nets 9 are formed in such a way as to have such a wire mesh structure made of, for example, an Ni-based metal that the filter body 4 or 20 can be uniformly heated therewith.

Figure 3:
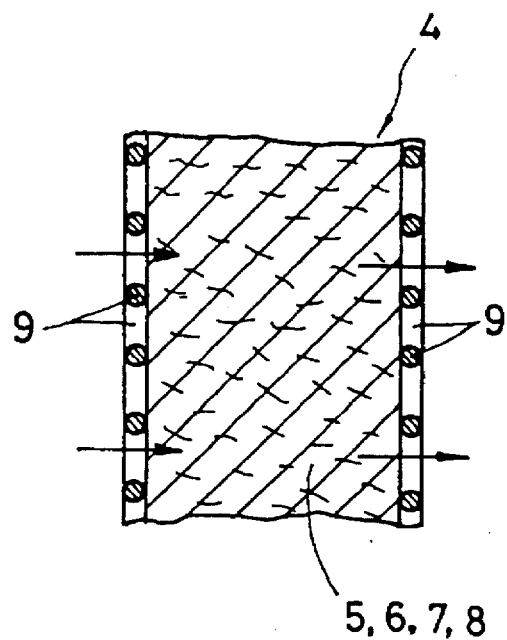
FIG. 3 is a cross-sectional view of an embodiment of a filter body in the diesel particulate filter apparatus of FIG. 2.
Figure 4:
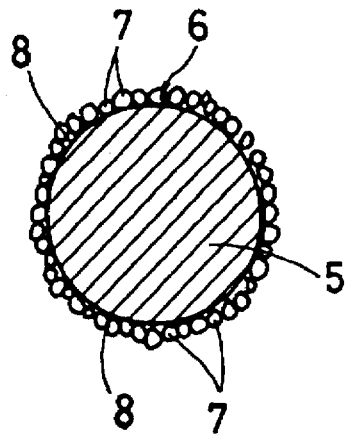
FIG. 4 is a cross-sectional view of the fiber of a ceramic fiber material constituting the filter body of FIG. 3.

In this diesel particulate filter apparatus 1, the conductive metal nets 9 are laminated on the two surfaces of the plate-shaped filter body 4 to provide a sandwich structure as shown in FIG. 3. The filter body 4 is constituted of a silicon carbide ceramic fiber material 5. The surface of the fiber of the ceramic fiber material 5 is covered with a coating layer 6 made of a compound 7 having a brownmillerite-like structure capable of exhibiting order-disorder transition of oxygen defects (hereinafter sometimes referred to as a "barium compound") as shown in FIG. 4. The filter body 4 is constituted of a nonwoven fabric which is the randomly laminated ceramic fiber material 5, the surface of the fiber of which is covered with the coating layer 6. The silicon carbide ceramic fiber material 5 is constituted of an SiC fiber material or an SiC—Ti—O fiber material (Si—C—O, Si—Ti—C—O, Si—C). The ceramic fiber material 5 is formed by laminating long fibers at random into a felty form. The fiber diameter of the ceramic fiber material 5 is, for example, about 5 to 15 µm, while the fiber length thereof is, for example, about 30 to 150 mm. On the other hand, the felty filter body 4 made of the laminated long fibers is formed to have a thickness of, for example, about 3 to 5 mm.

A powder of the barium compound 7 having a brownmillerite-like structure is attached to a liquid layer of an oxynitride glass, which is then sintered to be converted into a glass layer 8, whereby the surface of the fiber of the ceramic fiber material 5 is covered with the barium compound 7 having a brownmillerite-like structure and the glass layer 8, i.e., with the coating layer 6. Such barium compound 7 which can be used especially is one having a brownmillerite-like structure capable of exhibiting order-disorder transition of oxygen defects at a given temperature, i.e., $Ba_2In_2O_5$, $Ba_3Y_4O_9$, or $BaLa_2O_4$. On the other hand, the liquid layer of the oxynitride glass is a sol-gel liquid layer of an Mg—Al—Si—O—N or Y—Al—Si—O—N glass.

This diesel particulate filter apparatus 1 has the foregoing constitution and works in the following manner. When the diesel engine is driven, exhaust gas is sent into the exhaust gas path 13 via the exhaust pipe. The gas is sent from the inlet 14 into the exhaust gas path 13 and passed across the filter body 4 to collect particulates such as soot, carbon and smoke contained in the gas with the filter body 4, from which the resulting clean exhaust gas is discharged toward the outlet 15. The collected particulates are deposited on the filter body 4. A sensor for detecting the pressure of the exhaust gas or the amount of the collected particulates is provided in the case 3. Information on the pressure of the exhaust gas or the amount of the collected particulates, detected by the sensor, is inputted into the controller 10. The controller 10 is further provided with various sensors for detecting the operating conditions of the engine, such as a revolution sensor for detecting the number of revolutions of the engine, a load sendor for detecting the load on the engine, and a temperature sensor for detecting the temperature of the exhaust gas.

The controller 10 receives detection signals indicating the operating conditions of the engine and controls the electric current supplied to the conductive metal nets 9 in accordance with a predetermined detection value of the pressure of the gas or the amount of the particulates corresponding to the operating conditions of the engine to control the timing of regeneration of the filter body 4. More specifically, the controller 10 recieves detection signals from various sensors such as a pressure sensor, judges the operating conditions of the engine from the detected values thereof, and supplies electric current to the metal nets 9 via the electrode terminals 11 according to the command of the controller 10 to heat the metal nets 9 to thereby heat the filter body 4 when the amount of the particulates reaches a predetermined value, whereby the collected particulates can be heated and incinerated. In other words, the particulates are heated and combusted using a slight amount of air contained in the exhaust gas being passed across the filter body 4 by making the most of the principle of an excessive proportion of air in a diesel engine, whereby the particulates can be incinerated and gasified through conversion thereof into $CO_2$ and $H_2O$, which are discharged from the outlet 15.

Figure 5:
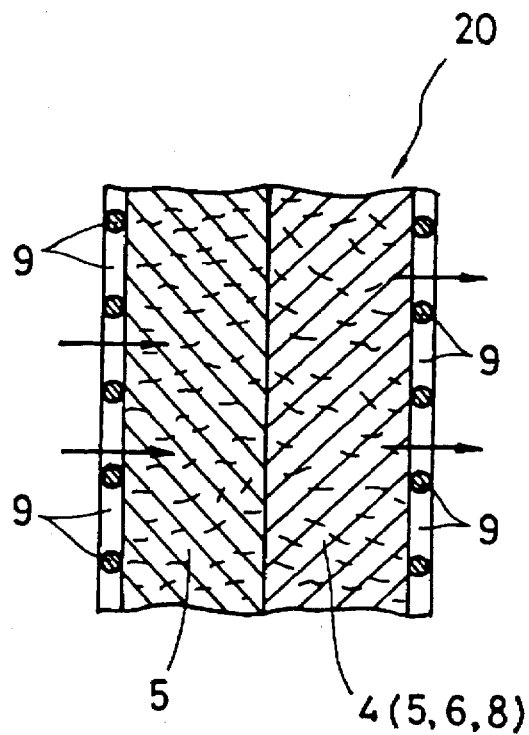
FIG. 5 is a cross-sectional view of another embodiment of a filter body in the diesel particulate filter apparatus of FIG. 1.

Another embodiment of the diesel particulate filter apparatus of the present invention will now be described by referring to FIG. 5. As shown in FIG. 5, in a filter body 20, a ceramic fiber material 5 such as an SiC fiber material or an $Si_3N_4$ fiber material is disposed on the upstream side of the exhaust gas, and a filter body 4 constituted of a nonwoven fabric in the form of a ceramic fiber material 5, the fiber of which has a coating layer 6 on the surface thereof, is disposed on the downstream side thereof. In this embodiment, particulates such as carbon, soot and HC can be collected with the ceramic fiber material 5 disposed on the upstream side of the exhaust gas, and $NO_x$ can then be reduced by the action of the filter body 4 with the coating layer 6 disposed on the downstream side of the gas, whereby the gas can be purified as a whole.

Figure 6:
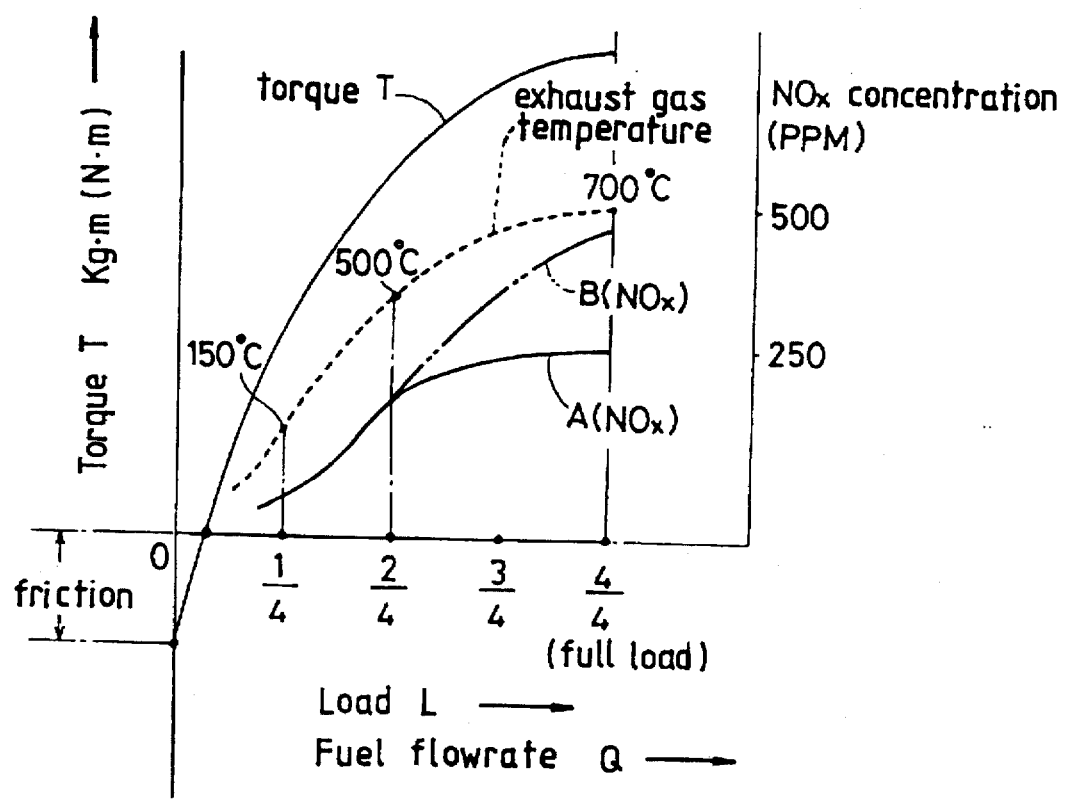
FIG. 6 is a schematic diagram showing the fuel flow rate versus torque and $NO_x$ concentration relationships in a diesel engine.

In the filter body 4, the surface of the fiber of the ceramic fiber material 5 is covered with the coating layer 6 capable of performing an $NO_x$-reducing action. As shown in FIG. 6, when the engine is driven, the flow rate Q of the fuel being supplied is increased in keeping with the increasing load L on the engine to increase the torque T and simultaneously elevate the temperature GT of the exhaust gas. When the temperature GT of the gas is elevated, a large amount of $NO_x$ is generated in combustion of fuel as indicated by the broken line B, with the result that a large amount of $NO_x$ is contained in the exhaust gas.

Since the fiber of the ceramic fiber material 5 is covered with the coating layer 6, however, the reduction reaction of $NO_x$ in the exhaust gas becomes active by the action of the barium compound 7 having a brownmillerite-like structure constituting the coating layer 6 to reduce $NO_x$ in the exhaust gas into $N_2$ and $O_2$ to thereby decrease the amount of $NO_x$ contained in the gas as indicated by the solid line A, when the temperature GT of the gas, which reaches 500° C. when, for example, the engine load becomes ¾ of the full value, exceeds 500° C.

More specifically, when the load on the engine is low, the $NO_x$-reducing action of the coating layer 6 is not so much required since the amount of $NO_x$ being generated is small. By contrast, when the load on the engine is median or higher, the $NO_x$-reducing action of the coating layer 6 becomes active to decrease the amount of $NO_x$ in the exhaust gas. Accordingly, this diesel particulate filter apparatus 1 can match the operating conditions of the engine for suppressing the generation of $NO_x$.

Figure 7:
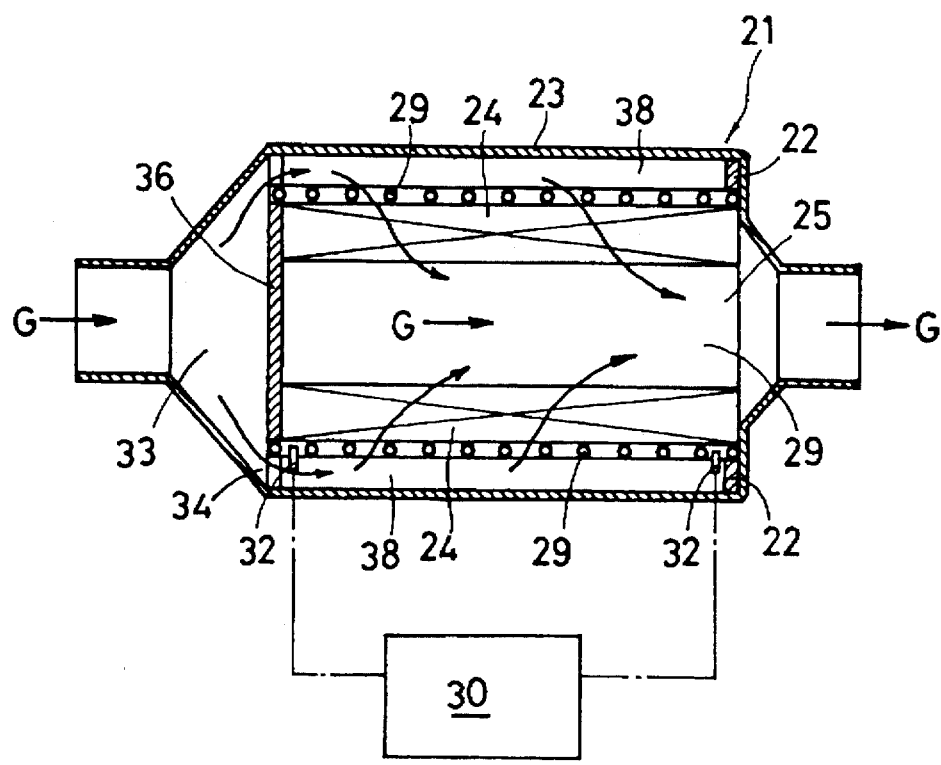
FIG. 7 is a schematic cross-sectional view of another embodiment of the diesel particulate filter apparatus of the present invention.
Figure 8:
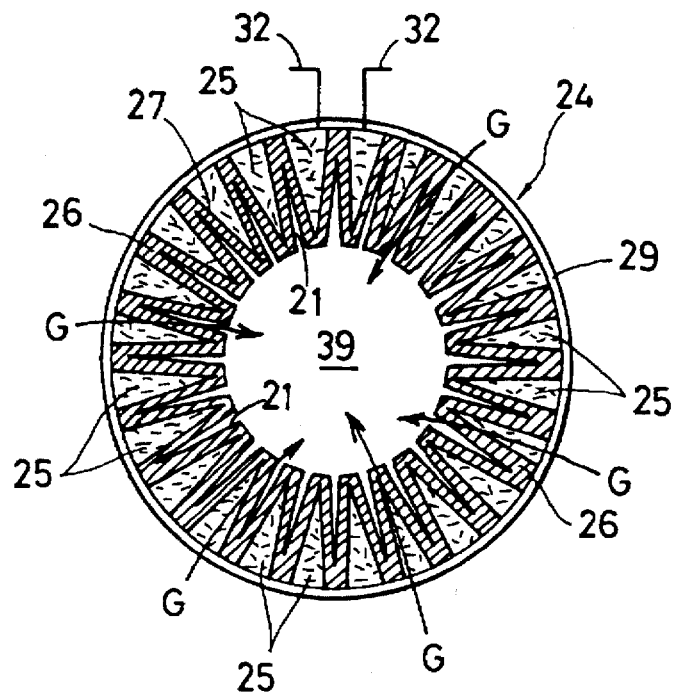
FIG. 8 is a cross-sectional view of an embodiment of a set of filter bodies in the diesel particulate filter apparatus of FIG. 7.

Still another embodiment of the diesel particulate filter apparatus of the present invention will now be described by referring to FIGS. 7 to 8. In the diesel particulate filter apparatus 21, exhaust gas is flowed across filter bodies 24 in the directions indicated by the arrows G in the same manner as in the foregoing embodiments to collect the particulates contained in the exhaust gas with the filter bodies 24, and the collected particulates are heated and incinerated to regenerate the filter bodies 24. The filter bodies 24 are constituted of porous sinters 26 bent in the form of pleated tubes and ceramic fiber materials 25 disposed in the outer peripheral recesses of the porous sinter 26 as shown in FIG. 8, which will be described later in more detail. The regeneration of the filter bodies 24 can be attained by supplying electric current to a conductive metal net 29 to heat the filter bodies 24 to thereby heat and incinerate the particulates collected with the filter bodies 24. Since the metal net 29 is in indirect contact with the porous sinter 26 via the fiber layers of the ceramic fiber materials 25, the amount of heat conduction is small when electric current is supplied to elevate the temperature, whereby the consumption of electric power can be decreased because the temperature is elevated in a short time. Although the porous sinter 26 as one of the filter bodies 24 is sequentially bent in a corrugated form in FIG. 8, it may be in the form of a tube such as a cylinder, a flat plate, a wavy profile, or the like.

The filter bodies 24 are disposed extending from an inlet 34 to an outlet 35 in an exhaust gas path 33 in a case 23. A heat-barrier material, though not shown in FIG. 7, is disposed on the inner wall surface of the case 23 in order to prevent heat from being radiated outside. The filter bodies 24 are fixed to the case 23 by means of fasteners or the like. The metal net 29 is wound around the outer periphery of the filter bodies 24. When the exhaust gas discharged from the diesel engine is flowed across the filter bodies 24, the particulates contained in the gas are collected with the filter bodies 24, on the upstream side of which a larger amount of the particulates is collected. The particulates collected with the filter bodies 24 are heated and incinerated by supplying electric current to the metal net 29 via terminals 32 according to the command of a controller 30 to be converted into gases such as $CO_2$ and $H_2O$, which are discharged from the outlet 35.

The porous sinter 26 as one of the filter bodies 24 is in the form of a pleated body formed into a tubular form. On the side of the inlet 34, a hollow portion 38 is open, while the other region is closed with a shield plate 36. On the side of the outlet 35, the hollow portion 38 is closed with a shield plate 22, while a central portion 39 of the other region is open. Accordingly, the exhaust gas inflowing from the inlet 34 of the exhaust gas path 33 is flowed from the hollow portion 38 across the filter bodies 24 to the inside of the central portion 39 to collect particulates in the gas with the filter bodies 24, from which the gas is then discharged toward the outlet 35.

The regeneration of the filter bodies 24 is effected by supplying electric current to the metal net 29 in the same manner as in the foregoing embodiments to heat and incinerate the particulates.

As shown in FIG. 8, the diesel particulate filter apparatus 21 is constituted of the randomly laminated ceramic fiber materials 25 formed as nonwoven fabrics and the porous sinter 26 disposed on the downstream side of the ceramic fiber materials 25 and containing a barium compound having a brownmillerite-like structure with an $NO_x$-reducing action as shown in FIG. 8. The porous sinter 26 is formed into a substantially cylindrical porous filter having a profile provided with pleated portions 37 jagged on the outer surface thereof and groove portions 31 on the inner surface thereof. The ceramic fiber materials 25 are filled between the pleated portions 37 of the porous filter in the form of the porous sinter 26 on the outer side thereof. On the other hand, the conductive metal net 29 is wound on the outer sides of the ceramic fiber materials 25 in such a way that the metal net 29 is not in direct contact with the porous sinter 26.

In this diesel particulate filter apparatus 21, the ceramic fiber materials 25 are constituted of long fibers of an $Si_3N_4$ fiber material, an SiC fiber material or an SiC—Ti—O fiber material (Si—C—O, Si—Ti—C—O, Si—C). The ceramic fiber materials 5 are formed by laminating the long fibers at random into a felty form. The fiber diameter of the ceramic fiber materials 25 is, for example, about 5 to 15 μm, while the fiber length thereof is, for example, about 30 to 150 mm.

On the other hand, the porous sinter 26, which works as a catalyst having an $NO_x$-reducing action, is constituted of a barium compound capable of exhibiting order-disorder transition of oxygen defects. The porous sinter 26 is formed by adding an oxynitride glass to a powder of the barium compound and sintering the resulting mixture to convert the oxynitride glass into a ceramic in the form of a glass layer.

Thus, the porous structure of the porous sinter is made up of the barium compound and the glass layer. The pore size of the porous structure is set to be 30 μm to 50 μm. As the barium compound, there can especially be used a compound having a brownmillerite-like structure capable of exhibiting order-disorder transition of oxygen defects at a given temperature, such as $Ba_2In_2O_5$, $Ba_3Y_4O_9$, or $BaLa_2O_4$. On the other hand, the oxynitride glass is an Mg—Al—Si—O—N or Y—Al—Si—O—N mixture comprising $SiO_2$, $AlO_3$ and MgO or the like as well as N added thereto.

Since this diesel particulate filter apparatus 21 has the foregoing constitution and is operated in the same manner as in the foregoing examples, the description of operation thereof is dispensed with herein.

The particulates in the exhaust gas are collected with this diesel particulate filter apparatus 21 as described above. In this case, since the filter bodies 24 have the porous sinter 26 capable of performing an $NO_x$-reducing action, which is disposed on the downstream side of the ceramic fiber materials 25, the reduction reaction of $NO_x$ in the exhaust gas becomes active by the action of the barium compound having a brownmillerite-like structure constituting the porous sinter 26 in the same manner as shown in FIG. 6 in connection with the foregoing embodiment when the engine is driven, whereby $NO_x$ in the exhaust gas is reduced into $N_2$ and $O_2$ to decrease the amount of the $NO_x$ contained in the exhaust gas as indicated by the solid line A in FIG. 6.

Figure 9:
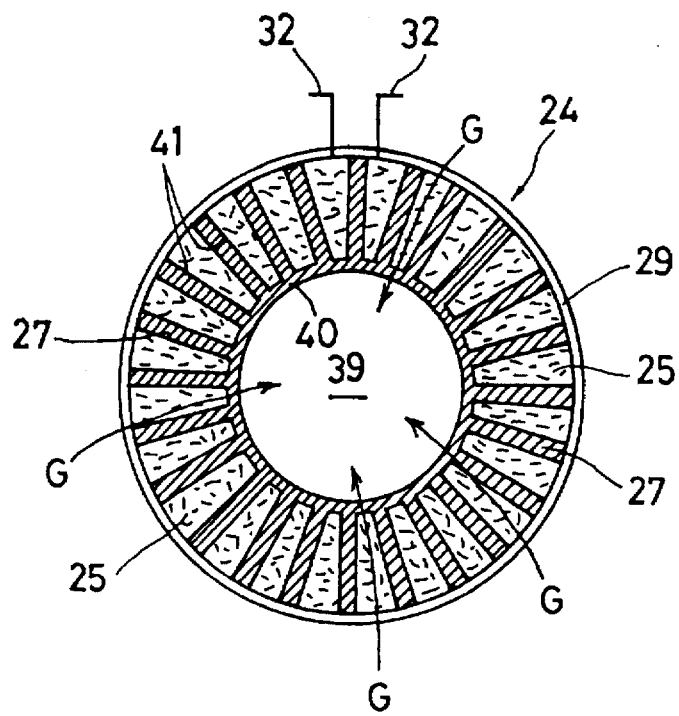
FIG. 9 is a cross-sectional view of another embodiment of a set of filter bodies in the diesel particulate filter apparatus of FIG. 7.

Another embodiment of a set of the filter bodies 24 will now be described by referring to FIG. 9. This embodiment has the same constitution and function as the foregoing embodiment except that the shape of the porous sinter is different from that of the foregoing embodiment. The porous sinter 27 of this embodiment is constituted of an inner cylindrical portion 40 and plate portions 41 radially extending from the outer surface of the cylindrical portion 40 in the longer direction thereof to form a pleated portion. The ceramic fiber materials 25 are disposed between the plate portions 41 of the porous sinter 27.

Figure 10:
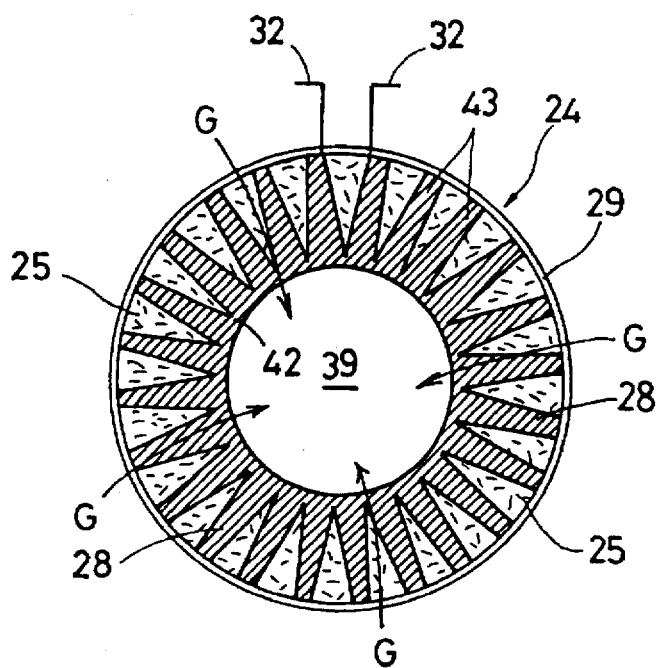
FIG. 10 is a cross-sectional view of still another embodiment of a set of filter bodies in the diesel particulate filter apparatus of FIG. 7.

Still another embodiment of a set of the filter bodies 24 will now be described by referring to FIG. 10. This embodiment has the same constitution and function as the foregoing embodiment except that the shape of the porous sinter is different from that of the foregoing embodiment. The porous sinter 28 of this embodiment is constituted of an inner cylindrical portion 42 and wedge-like plate portions 43 radially extending from the outer surface of the cylindrical portion 42 in the longitudinal direction thereof to form a pleated portion. The ceramic fiber materials 25 are disposed between the wedge-like plate portions 43 of the porous sinter 28.

What is claimed is:

1. A diesel particulate filter comprising: a filter body for collecting particulates contained in exhaust gas discharged from a diesel engine, said filter body being constituted of nonwoven fabrics which are randomly laminated ceramic fiber materials, and wherein surfaces of the fiber materials are covered with a coating layer made of a compound having a brownmillerite-like structure having an $NO_x$-reducing agent.

2. A diesel particulate filter apparatus according to claim 1, wherein said filter bodies are formed into tubes provided with pleated portions.

3. A diesel particulate filter apparatus according to claim 1, wherein said compound constituting said coating layer is at least one compound selected from the group consisting of $Ba_2In_2O_5$, $Ba_3Y_4O_9$, and $BaLa_2O_4$ capable of exhibiting order-disorder transition of oxygen defects.

4. A diesel particulate filter apparatus according to claim 3, wherein the covering of said coating layer on the surface of the fiber of said ceramic fiber materials is formed by attaching a liquid layer of an oxynitride glass to the surface of said fiber and attaching to the surface thereof a powder of at least one compound selected from the group consisting of $Ba_2In_2O_5$, $Ba_3Y_4O_9$, and $BaLa_2O_4$, followed by sintering thereof.

5. A diesel particulate filter apparatus according to claim 1, wherein said ceramic fiber materials are constituted of at least one material selected from the group consisting of an SiC fiber material, an SiC—Ti—O fiber material, and an $Si_3N_4$ fiber material.

6. A diesel particulate filter apparatus according to claim 1, wherein conductive metal nets are disposed on the surfaces of said filter bodies, and wherein the particulates collected with said filter bodies are heated and incinerated by supplying electric current to said metal nets.

7. A diesel particulate filter apparatus according to claim 1, wherein the outer peripheries of said filter bodies are covered with heat-barrier layers.

8. A diesel particulate filter apparatus according to claim 1, wherein said laminate materials of said nonwoven fabrics constituted of said ceramic fiber materials without said coating layer are constituted of ceramic fiber materials selected from the group consisting of SiC fiber materials and $Si_3N_4$ fiber materials and disposed on the upstream side of the exhaust gas, while said laminate materials of said nonwoven fabrics constituted of said ceramic fiber materials with said coating layer covering the surface of the fiber thereof are disposed on the downstream side of the exhaust gas.

9. A diesel particulate filter apparatus according to claim 1, wherein said compound having a brownmillerite-like structure is an oxide of barium.

10. A diesel particulate filter apparatus according to claim 1, wherein said compound having a brownmillerite-like structure is an oxide of barium and another metal.

11. A diesel particulate filter apparatus according to claim 10, wherein said other metal is In, Y or La.

12. A diesel particulate filter apparatus comprising first filter bodies constituted of nonwoven fabrics which are randomly laminated ceramic fiber materials for collecting particulates contained in the exhaust gas of a diesel engine, conductive metal nets each disposed on one side of each first filter body, and second filter bodies each disposed on the other side of each first filter body and constituted of porous sinters containing a compound having a brownmillerite structure having an $NO_x$-reducing action.

13. A diesel particulate filter apparatus according to claim 12, wherein said compound is at least one compound selected from the group consisting of $Ba_2In_2O_5$, $Ba_3Y_4O_9$, and $BaLa_2O_4$ capable of exhibiting order-disorder transition of oxygen defects.

14. A diesel particulate filter apparatus according to claim 12, wherein said second filter bodies constituted of said porous sinters are formed into tubes provided with pleated portions jagged on the outer surfaces thereof, wherein said ceramic fiber materials are disposed between said pleated portions on the outer sides of said tubes and along the outer peripheries of said tubes, and wherein said conductive metal nets are disposed on the outer sides of said ceramic fiber materials.

15. A diesel particulate filter apparatus according to claim 12, wherein said ceramic fiber materials are constituted of long fibers of an SiC fiber material and/or an $Si_3N_4$ fiber material.

16. A diesel particulate filter apparatus according to claim 12, wherein the particulates collected with said first filter bodies constituted of said ceramic fiber materials are heated and incinerated by supplying electric current to said metal nets.

17. A diesel particulate filter apparatus according to claim 12, wherein $NO_x$ is reduced when the exhaust gas is passed across said second filter bodies.

18. A diesel particulate filter apparatus according to claim 12, wherein said second filter bodies are ones produced by mixing at least one compound selected from the group consisting of $Ba_2In_2O_5$, $Ba_3Y_4O_9$, and $BaLa_2O_4$ capable of exhibiting order-disorder transition of oxygen defects with an oxynitride glass comprising $SiO_2$, $Al_2O_3$ and MgO as well as N added thereto, and sintering the resulting mixture.

19. A diesel particulate filter apparatus according to claim 12, wherein said porous sinters of said second filter bodies are controlled to have a pore size of 15 to 50 μm.

20. A diesel particulate filter apparatus comprising at least one filter body for collecting particulates contained in an exhaust gas discharge from a diesel engine;

said filter body comprising a felted body of ceramic fibers, at least some of said ceramic fibers having a surface coating of a compound having a brownmillerite-like structure having an $NO_x$-reducing action.

* * * * *